(12) United States Patent
Kumar et al.

(10) Patent No.: US 12,526,086 B2
(45) Date of Patent: Jan. 13, 2026

(54) DETECTING UNRESPONSIVE USER EQUIPMENT

(71) Applicant: Dell Products L.P., Round Rock, TX (US)

(72) Inventors: Sunil Kumar, Bangalore (IN); Thiruvenkatam Muthukrishnan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 18/364,913

(22) Filed: Aug. 3, 2023

(65) Prior Publication Data

US 2025/0047420 A1 Feb. 6, 2025

(51) Int. Cl.
*H04L 1/1822* (2023.01)
*H04W 72/1273* (2023.01)

(52) U.S. Cl.
CPC ....... *H04L 1/1822* (2013.01); *H04W 72/1273* (2013.01)

(58) Field of Classification Search
CPC .................. H04L 1/1822; H04W 72/1273
USPC ........................................................ 370/329
See application file for complete search history.

(56) References Cited

U.S. PATENT DOCUMENTS

| | | | |
|---|---|---|---|
| 10,070,480 B1 | 9/2018 | Narendran et al. | |
| 11,076,439 B2 | 7/2021 | Babaei | |
| 11,184,787 B2 | 11/2021 | Muruganathan et al. | |
| 11,751,163 B2 * | 9/2023 | Black | H04W 68/005 370/329 |
| 2005/0249141 A1 | 11/2005 | Lee et al. | |
| 2006/0034205 A1 | 2/2006 | Kim | |
| 2006/0146858 A1 | 7/2006 | Kim | |
| 2014/0169338 A1 | 6/2014 | Bajko | |
| 2016/0037541 A1 | 2/2016 | Kim et al. | |
| 2016/0226629 A1 * | 8/2016 | Liu | H04L 5/00 |
| 2017/0195891 A1 | 7/2017 | Smith et al. | |
| 2019/0045580 A1 | 2/2019 | Chai et al. | |

(Continued)

FOREIGN PATENT DOCUMENTS

| | | | | |
|---|---|---|---|---|
| CN | 120019600 A | * | 5/2025 | ........... H04L 1/1822 |
| EP | 2844023 | | 3/2015 | |

(Continued)

OTHER PUBLICATIONS

"5G; NR; Packet Data Convergence Protocol (PDCP) specification" 3GPP TS 38.323 version 16.2.0 Release 16, 2020, 42 pages.

(Continued)

*Primary Examiner* — Anthony Mejia
(74) *Attorney, Agent, or Firm* — Amin, Turocy & Watson, LLP

(57) ABSTRACT

A system can communicate broadband cellular communications with a user equipment. The system can perform iterations of scheduling downlink data for the user equipment as part of the broadband cellular communications. The system can, in response to determining that hybrid automatic repeat request feedback, which corresponds to downlink data of the iterations of scheduling downlink data, has not been received within a defined time period, initiate a user equipment release transaction with regard to the user equipment, and send a user equipment context release request to a centralized unit of a base station of the system.

20 Claims, 11 Drawing Sheets

(56) References Cited

U.S. PATENT DOCUMENTS

| | | | |
|---|---|---|---|
| 2019/0141557 A1 | 5/2019 | Da Silva et al. | |
| 2019/0200292 A1 | 6/2019 | Lin et al. | |
| 2019/0342037 A1* | 11/2019 | Karaki | H04L 1/1854 |
| 2021/0044387 A1* | 2/2021 | Vaidya | H04L 1/1812 |
| 2021/0329727 A1 | 10/2021 | Yu | |
| 2022/0124579 A1 | 4/2022 | Han et al. | |
| 2022/0149922 A1 | 5/2022 | Wang et al. | |
| 2022/0174458 A1 | 6/2022 | Peng et al. | |
| 2022/0210860 A1* | 6/2022 | Chin | H04W 72/23 |
| 2022/0303755 A1 | 9/2022 | Karakkad Kesavan Namboodiri et al. | |
| 2022/0337351 A1* | 10/2022 | Lin | H04L 1/1822 |
| 2023/0084318 A1* | 3/2023 | Ozturk | H04L 1/1848 370/328 |
| 2023/0137081 A1 | 5/2023 | Kim et al. | |
| 2023/0138578 A1* | 5/2023 | Azizi | H04B 17/3913 370/329 |
| 2023/0189315 A1* | 6/2023 | Haustein | H04W 24/02 370/252 |
| 2023/0217506 A1* | 7/2023 | Löhr | H04W 52/0216 370/329 |
| 2023/0379092 A1* | 11/2023 | Chin | H04W 72/232 |
| 2023/0388204 A1 | 11/2023 | Ramachandra et al. | |
| 2023/0396991 A1 | 12/2023 | Jena et al. | |
| 2024/0276301 A1 | 8/2024 | Zhu et al. | |
| 2024/0292348 A1* | 8/2024 | Luetzenkirchen | H04L 43/0817 |
| 2024/0356828 A1 | 10/2024 | Guo et al. | |
| 2025/0047420 A1* | 2/2025 | Kumar | H04W 76/38 |
| 2025/0247858 A1* | 7/2025 | Talarico | H04W 74/0808 |

FOREIGN PATENT DOCUMENTS

| | | | | |
|---|---|---|---|---|
| EP | 3965313 | | 3/2022 | |
| EP | 4274135 A1 | * | 11/2023 | H04L 1/1864 |
| KR | 20230163422 A | * | 11/2023 | H04L 1/1861 |
| WO | WO-2019099383 A1 | * | 5/2019 | H04L 1/1614 |
| WO | 2023/043521 | | 3/2023 | |
| WO | WO-2025021648 A1 | * | 1/2025 | H04W 52/028 |

OTHER PUBLICATIONS

"5G; NR; Radio Resource Control (RRC); Protocol specification" 3GPP TS 38.331 version 17.0.0 Release 17, 2022, 1197 pages.

"5G; NR; Requirements for support of radio resource management" 3GPP TS 38.133 version 15.3.0 Release 15, 2018, 134 pages.

Kumar et al. "Detecting Unresponsive User Equipment" U.S. Appl. No. 18/364,905, filed Aug. 3, 2023, 47 pages.

Kumar et al. "Detecting Unresponsive User Equipment" U.S. Appl. No. 18/364,923, filed Aug. 3, 2023, 46 pages.

Kumar et al. "Detecting Unresponsive User Equipment" U.S. Appl. No. 18/364,931, filed Aug. 3, 2023, 45 pages.

International Search Report and Written Opinion for PCT Application No. PCT/US2023/036312, mailed Apr. 23, 2024, 17 pages.

"3rd Generation Partnership Project; Technical Specification Group Radio Access Network; NR; Physical layer procedures for data (Release 17)", 3GPP TS 38.214, V17.6.0, Jun. 2023, 231 pages.

International Search Report and Written Opinion for PCT Application No. PCT/US2023/036313, mailed Apr. 16, 2024, 15 pages.

International Search Report and Written Opinion for PCT Application No. PCT/US2023/036314, mailed May 3, 2024, 11 pages.

International Search Report and Written Opinion for PCT Application No. PCT/US2023/036315, mailed Apr. 22, 2024, 15 pages.

Office Action mailed Aug. 14, 2025 for U.S. Appl. No. 18/364,905, 48 pages.

Office Action mailed Aug. 7, 2025 for U.S. Appl. No. 18/364,923, 37 pages.

Office Action mailed Nov. 5, 2025 for U.S. Appl. No. 18/364,931, 34 pages.

3GPP TS 38.473, Technical Specification Group Radio Access Network, NG-RAN, F1 application protocol (F1AP), Rel-17, V17.0.0, Apr. 2022 (Year: 2022).

Tweet4Technology, https://tweet4technology.blogspot.com/2016/11/measurement-controlrrc-connection.html, LTE 5G-NR Wireless Technology Blog, Nov. 28, 2016 (Year: 2016).

Notice of Allowance mailed Nov. 18, 2025 for U.S. Appl. No. 18/364,923, 31 pages.

\* cited by examiner

300

800

802

↓

COMMUNICATING BROADBAND CELLULAR COMMUNICATIONS WITH A USER EQUIPMENT 804

↓

PERFORMING ITERATIONS OF SCHEDULING DOWNLINK DATA FOR THE USER EQUIPMENT AS PART OF THE BROADBAND CELLULAR COMMUNICATIONS 806

↓

IN RESPONSE TO DETERMINING THAT HYBRID AUTOMATIC REPEAT REQUEST FEEDBACK, WHICH CORRESPONDS TO DOWNLINK DATA OF THE ITERATIONS OF SCHEDULING DOWNLINK DATA, HAS NOT BEEN RECEIVED WITHIN A DEFINED TIME PERIOD, INITIATING A USER EQUIPMENT RELEASE TRANSACTION WITH REGARD TO THE USER EQUIPMENT, AND SENDING A USER EQUIPMENT CONTEXT RELEASE REQUEST TO A CENTRALIZED UNIT OF A BASE STATION OF THE SYSTEM 808

AT LEAST ONE OF SENDING OR RECEIVING BROADBAND CELLULAR
COMMUNICATIONS TO OR FROM A USER EQUIPMENT, RESPECTIVELY 1004

↓

INSTRUCTING THE USER EQUIPMENT TO SEND PERIODIC HYBRID AUTOMATIC REPEAT REQUEST
FEEDBACK FROM THE USER EQUIPMENT TO THE SYSTEM, WHEREIN THE HYBRID AUTOMATIC REPEAT
REQUEST FEEDBACK CORRESPONDS TO THE BROADBAND CELLULAR COMMUNICATIONS 1006

↓

IN RESPONSE TO DETERMINING THAT A DEFINED NUMBER OF CONSECUTIVE HYBRID AUTOMATIC
REPEAT REQUEST FEEDBACK INDICATIONS OF THE HYBRID AUTOMATIC REPEAT REQUEST FEEDBACK
HAS NOT BEEN RECEIVED, INITIATING A USER EQUIPMENT RELEASE TRANSACTION FOR THE USER
EQUIPMENT 1008

DETECTING UNRESPONSIVE USER EQUIPMENT

RELATED APPLICATIONS

The subject patent application is related by subject matter to, U.S. patent application Ser. No. 18/364,905, filed Aug. 3, 2023 and entitled "DETECTING UNRESPONSIVE USER EQUIPMENT," the entirety of which application is hereby incorporated by reference herein.

The subject patent application is related by subject matter to, U.S. patent application Ser. No. 18364,923, filed Aug. 3, 2023 and entitled "DETECTING UNRESPONSIVE USER EQUIPMENT," the entirety of which application is hereby incorporated by reference herein.

The subject patent application is related by subject matter to, U.S. patent application Ser. No. 18/364,931, filed Aug. 3, 2023 and entitled "DETECTING UNRESPONSIVE USER EQUIPMENT," the entirety of which application is hereby incorporated by reference herein.

BACKGROUND

In cellular broadband communications, a core network can determine that a user equipment has become unresponsive.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can communicate broadband cellular communications with a user equipment. The system can perform iterations of scheduling downlink data for the user equipment as part of the broadband cellular communications. The system can, in response to determining that hybrid automatic repeat request feedback, which corresponds to downlink data of the iterations of scheduling downlink data, has not been received within a defined time period, initiate a user equipment release transaction with regard to the user equipment, and send a user equipment context release request to a centralized unit of a base station of the system.

An example method can comprise facilitating, by a system comprising a processor, broadband cellular communications with a user equipment. The method can further comprise instructing, by the system, the user equipment to provide periodic hybrid automatic repeat request feedback from the user equipment to the system, wherein the hybrid automatic repeat request feedback corresponds to the broadband cellular communications. The method can further comprise, in response to determining that a defined number of consecutive hybrid automatic repeat request feedback indications of the hybrid automatic repeat request feedback has not been received, initiating, by the system, a user equipment release transaction for the user equipment, and sending, by the system, a user equipment context release request to a centralized unit of a base station.

An example non-transitory computer-readable medium can comprise instructions that, in response to execution, cause a system comprising a processor to perform operations. These operations can comprise at least one of sending or receiving broadband cellular communications to or from a user equipment, respectively. These operations can further comprise instructing the user equipment to send periodic hybrid automatic repeat request feedback from the user equipment to the system, wherein the hybrid automatic repeat request feedback corresponds to the broadband cellular communications. These operations can further comprise, in response to determining that a defined number of consecutive hybrid automatic repeat request feedback indications of the hybrid automatic repeat request feedback has not been received, initiating a user equipment release transaction for the user equipment.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates another example process flow that can facilitate detecting unresponsive user equipment, in accordance with an embodiment of this disclosure;

FIG. 10 illustrates another example process flow that can facilitate detecting unresponsive user equipment, in accordance with an embodiment of this disclosure;

DETAILED DESCRIPTION

Overview

Figure 1:
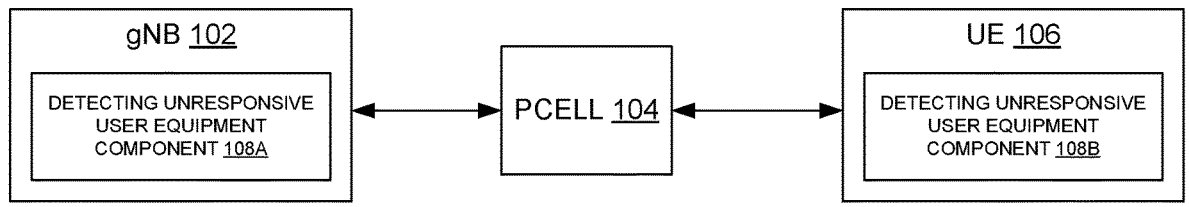
FIG. 1 illustrates an example system architecture that can facilitate detecting unresponsive user equipment, in accordance with an embodiment of this disclosure.

The present techniques can generally relate to detecting unresponsive user equipment using hybrid automatic repeat request (HARQ) feedback.

In cellular communications, HARQ feedback can comprise a user equipment (UE) adding error detection (ED) information and/or forward error correction (FEC) information to a message that is sent to a gNodeB (gNB). When a gNB receives such a message, it can decode the error-correction code. Where a channel quality between the UE and gNB is sufficiently good, the gNB can obtain the correct data block (such as by correcting any transmission errors). When channel quality between the UE and gNB is bad, it can be that not all transmission errors can be corrected, the gNB can identify this situation using error detection code, and the received data block can be rejected and the gNB can request that the UE retransmit the data block.

HARQ feedback from a UE can be used to determine if the UE is active or not. A gNB can determine that a UE is unreachable through block error rate (BLER; radio link control (RLC) unacknowledged mode (UM)) or RLC maximum retransmission (RLC acknowledged mode (AM)) in DL or UE reestablishment.

However, where there is no data or uplink (UL) interference, detecting a radio link failure (RLF) can be difficult for a gNB. In some examples, it can be that moving a UE to a radio resource control (RRC) inactive state due to data inactivity is not the right approach, as a data inactivity timer can be in seconds. Additionally, it can be that moving a UE to RRC inactive status can be unsuccessful where the UE is unreachable.

Given these problems with prior approaches, the present techniques can be implemented to facilitate using HARQ feedback to detect a reachability of a UE.

A UE can connect to a gNB to get multiple services like enhanced mobile broadband (eMBB) or voice over new radio (VoNR). With eMBB, a data rate between the UE and the gNB will be in gigabits per second (gbps). It can be that efficiently using over-the-air resources can be valuable in achieving and sustaining high data rates. Operators can buy spectrum from a government via auction, and using all resources in the spectrum can be important to providing good quality of service (QoS), and thereby attracting more customers, which can, in turn, result in higher revenue.

There can be problems with prior approaches to detecting that a RLF for a UE. With regard to a transmission control protocol (TCP) and/or a user datagram protocol (UDP), detecting RLF can be difficult for a gNB when there is no data, or when UL interference is high. A TCP retry timeout can take multiple seconds, and this amount of time to detect RLF can be too long.

Another problem with prior approaches can be that a gNB can allocate radio resources and schedule UDP data continuously to a UE even when the UE has stopped responding to the received data at a HARQ level.

Another problem with prior approaches can be that a gNB can allocate radio resources and schedule UDP data (data centric service) continuously to a UE, even when the UE has stopped responding to the received data at a packed data convergence protocol (PDCP) level (e.g., a level 2 (L2) internal failure at the UE).

In these scenarios, there can be active data flowing in a DL from an application in a gNB, and hence it can be that the UE is not moved to a RRC INACTIVE state. This can waste physical resources and reduce spectrum usage efficiency, where that spectrum could be utilized by other UEs that are functioning normally.

Even with an abnormal UE, early detection and release can mean a faster way to get in service, reduce out-of-service time, and reduce unwanted battery drain during an abnormal period.

In example, the present techniques can be implemented such that a gNB detects DL HARQ as discontinuous reception (DTX), and a UE-initiated release triggered from the gNB's distributed unit (DU) to the gNB's centralized unit (CU). The CU can trigger a release of the UE to all gNBs that the UE is connected to and access and mobility management function (AMF).

When a gNB schedules DL data for a UE, then the gNB continuously detects HARQ feedback as DTX, the gNB can start a timer, T_HARQ_DTX (ms). After expiry of this timer, if the UE has not become reachable, the gNB can start a UE release procedure to save physical resources. In some examples, T_HARQ_DTX can be determined as:

$$T\_HARQ\_DTX = (n310 * T\_EVALUATE\_OUT\_SSB + t310 + t301)$$

In this determination, n310 can comprise a parameter that indicates a number of times when the UE is unable to successfully decode physical downlink control channel (PDCCH) information due to low reference signal received power (RSRP) detected. That is, n310 can indicate a number of times in which the UE cannot successfully decode a specified number of consecutive frames in the downlink.

n310 can also comprise a maximum number of consecutive "out-of-sync" indications for a PCell that are received from lower layers.

t310 can comprise a timer, in seconds, used to allow the UE to get back in synchronization with the gNB.

The timer t310 can start upon detecting physical layer problems for a PCell—e.g., upon receiving n310 consecutive out-of-sync indications from lower layers.

The timer t310 can stop upon receiving n311 consecutive in-sync indications from lower layers for a PCell, upon triggering a handover procedure, and/or upon initiating the connection re-establishment procedure.

At expiry of the timer t310, if security is not activated, then an RRC_IDLE state can be entered, and otherwise ELSE a connection establishment procedure can be initiated.

n311 can comprise a parameter that indicates a number of intervals for which the UE successfully decodes the PDCCH to be considered back in sync with the gNB. That is, n311 can indicate a number of times in which the UE successfully decodes a specified number of frames in the downlink in order for the UE to assume the radio link is in-synch.

n311 can also comprise a maximum number of consecutive "in-sync" indications for a PCell received from lower layers.

T_EVALUATE_OUT_SSB can comprise a timer that is used by a UE to evaluate whether downlink radio link quality on a configured radio link monitoring reference signal (RLM-RS) resource estimated over a last $T_{Evaluate\_out\_SSB}$ (SSB evaluation timer) period (which can be measured in ms) becomes worse than a threshold $Q_{out\_SSB}$ within the $T_{Evaluate\_out\_SSB}$ evaluation period. $Q_{out\_SSB}$ can comprise a synchronization signal block (SSB) quality threshold value. The threshold $Q_{out}$ can indicate a level at which a downlink radio link cannot be reliably received and can correspond to an out-of-sync block error rate ($BLER_{out}$). For SSB based radio link monitoring. $Q_{out\_SSB}$ can be derived based on hypothetical PDCCH transmission parameters.

t301 can comprise a timer that starts at a transmission of a RRC connection re-establishment request. The timer t301 can stop at reception of a RRC connection re-establishment message or a RRC connection re-establishment reject message, as well as when a selected cell becomes unsuitable.

Upon expiry, the timer t301 can go to an RRC_IDLE state.

On the expiry of a timer, a counter, HARQBasedRlfCounter, can be checked. HARQBasedRlfCounter can comprise a counter that is incremented when HARQ feedback that should be received from the UE has not been received. This check can comprise performing the following determination:

If (HARQBasedRlfCounter>=T_HARQ_DTX) then,
  initiate UE release transaction and send UE context release request to CU with cause (radio_network_layer, RL failure, etc.)

It can be that HARQ feedback occurs where a gNB is sending DL data for a UE, and the gNB does not receive an ACK or NACK for the DL data, so detects this absence of an ACK/NACK as DTX. When this occurs, a gNB can determine that a UE has moved out of the gNB's coverage area, and the gNB can take an action to release the UE once the T_HARQ_DTX condition is satisfied.

Example Architectures

FIG. 1 illustrates an example system architecture 100 that can facilitate detecting unresponsive user equipment in accordance with an embodiment of this disclosure. In some examples, part(s) of system architecture 100 can be used to implement the example signal flows of FIGS. 4-5, and/or the example process flows of FIGS. 6-10.

In cellular communications, there can be a master cell group (MCG) to which a UE initially registers. A cell that is used to initiate initial access can be referred to as a primary cell (Pcell).

The examples herein generally relate to fifth generation (5G) cellular communications networks, where Pcells are used. It can be appreciated that the present techniques can be applied to other types of cellular communications networks for detecting unresponsive user equipment.

As depicted, system architecture 100 comprises gNodeB (gNB) 102, Pcell 104, UE 106, detecting unresponsive user equipment component 108A, and detecting unresponsive user equipment component 108B.

gNB 102 can generally comprise a cellular 5G base station, can comprise multiple antennas, and can concurrently communicate with multiple instances of UE 106. UE 106 can generally comprise a computing device that is configured to be used directly by an end-user to communicate with gNB 102. Pcell 104 can be a Pcell as described herein, and that is communicatively coupled to both gNB 102 and UE 106.

Detecting unresponsive user equipment component 108A can generally comprise a component of gNB 102 that facilitates detecting unresponsive user equipment for gNB 102 as described herein. Similarly, detecting unresponsive user equipment component 108B can generally comprise a component of UE 106 that facilitates detecting unresponsive user equipment for UE 106 as described herein.

Figure 4:
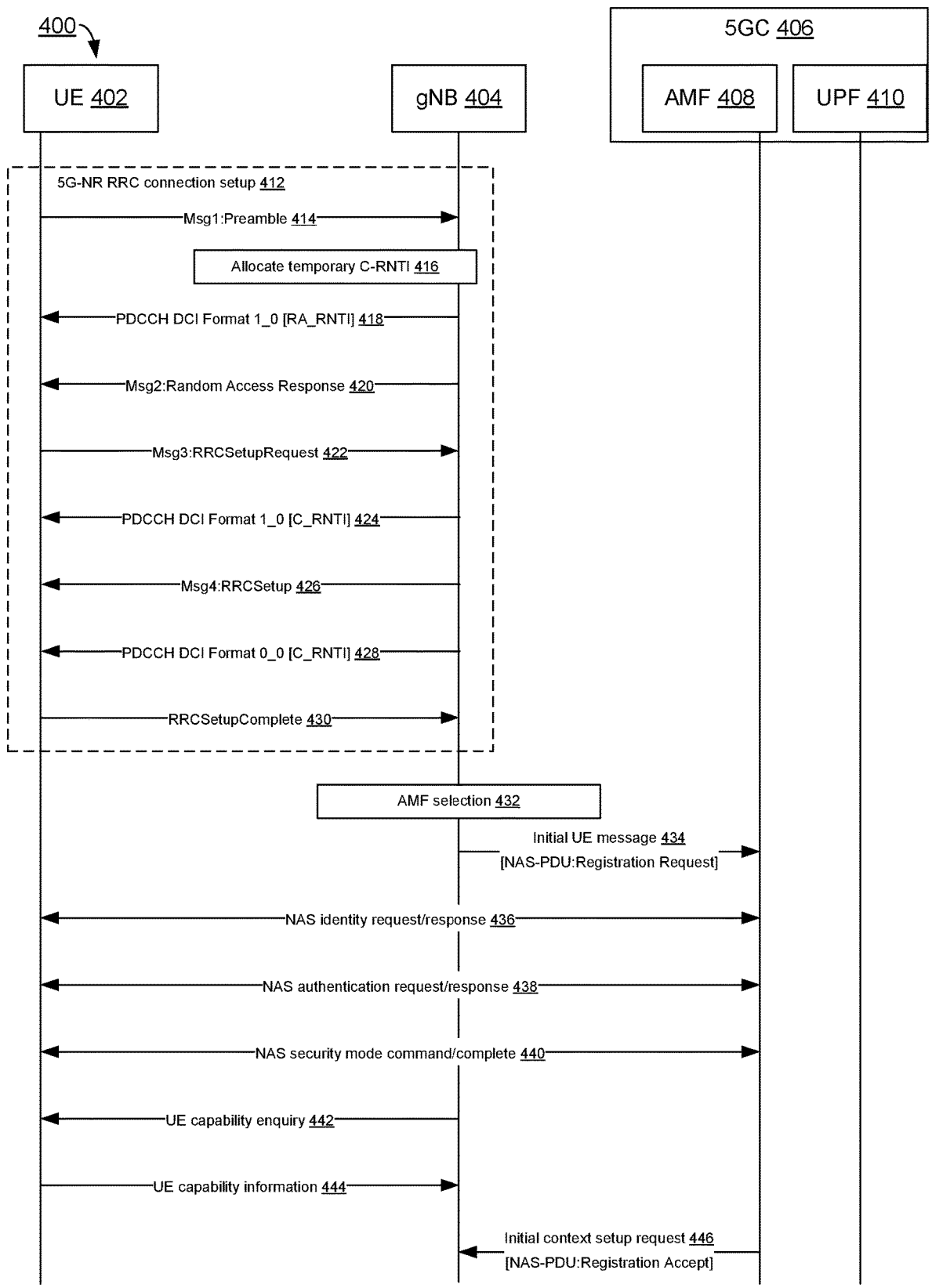
FIG. 4 and FIG. 5 illustrate an example signal flow that can facilitate detecting unresponsive user equipment, in accordance with an embodiment of this disclosure.
Figure 5:
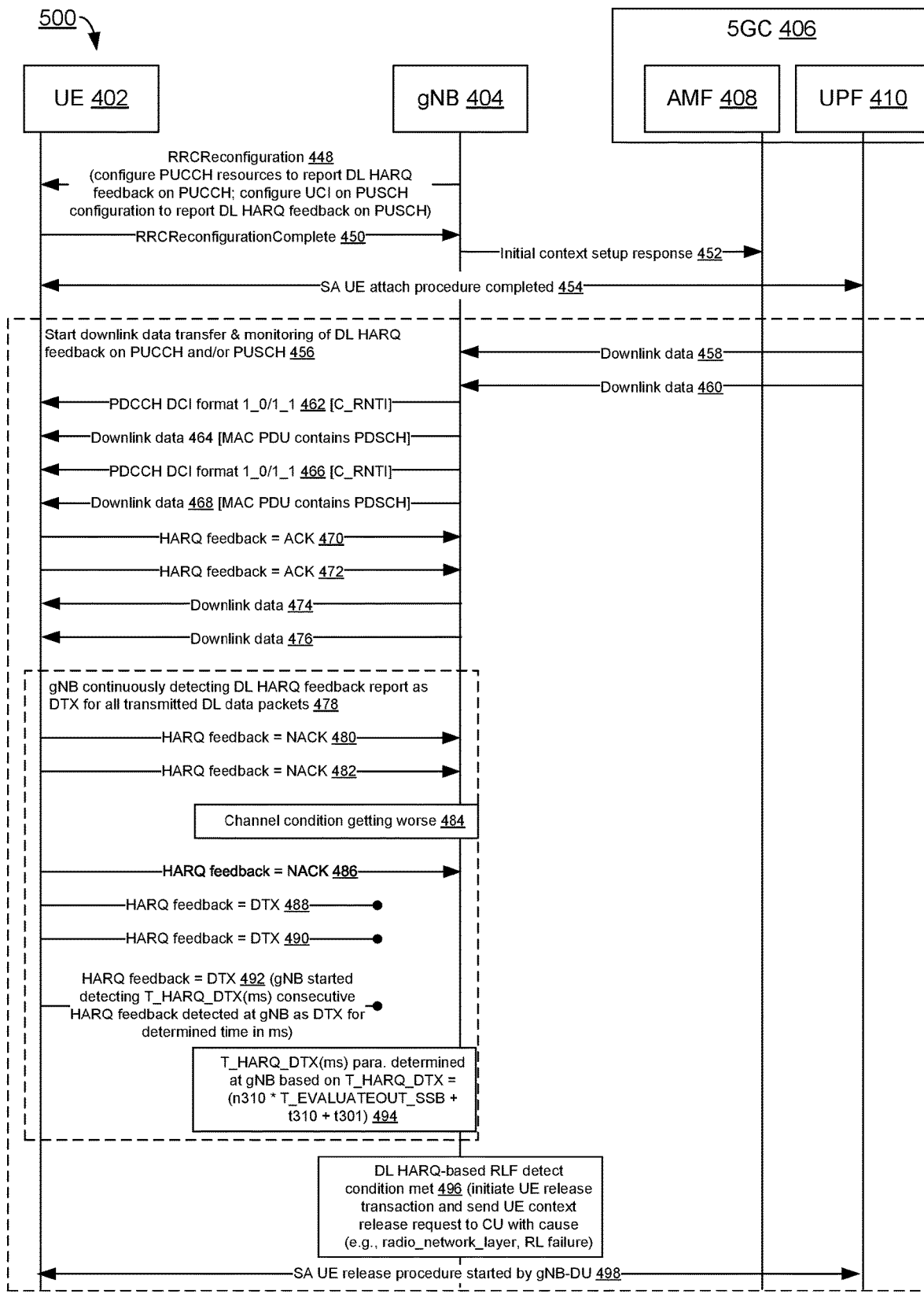

In some examples, detecting unresponsive user equipment component 108A can implement part(s) of the signal flows of FIGS. 4-5, and/or the process flows of FIGS. 6-10 to implement detecting unresponsive user equipment.

It can be appreciated that system architecture 100 (and each of the system architectures of FIGS. 2-3) is one example system architecture for generating and distributing security policies in a containerized environment, and that there can be other system architectures that facilitate generating and distributing security policies in a containerized environment.

Figure 2:
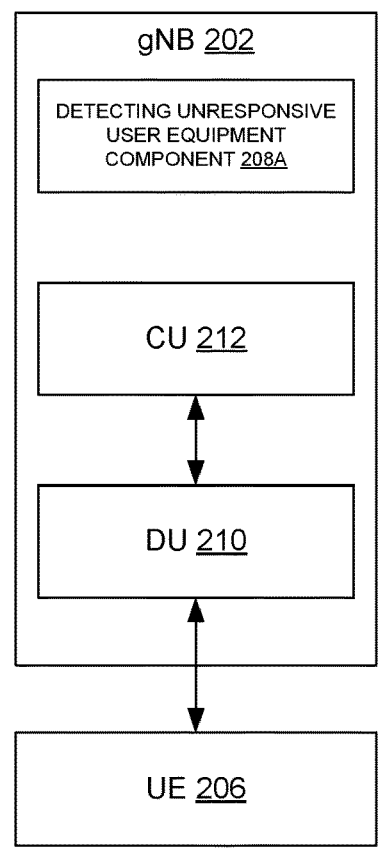
FIG. 2 illustrates another example system architecture that can facilitate detecting unresponsive user equipment, in accordance with an embodiment of this disclosure.

FIG. 2 illustrates another example system architecture 200 that can facilitate detecting unresponsive user equipment, in accordance with an embodiment of this disclosure. In some examples, part(s) of system architecture 200 can be implemented by part(s) of system architecture 100 of FIG. 1 to facilitate detecting unresponsive user equipment. In some examples, part(s) of system architecture 200 can be used to implement the example signal flows of FIGS. 4-5, and/or the example process flows of FIGS. 6-10.

System architecture 200 comprises gNB 202 (which can be similar to gNB 102 of FIG. 1), UE 206 (which can be similar to UE 106), detecting unresponsive user equipment component 208A (which can be similar to detecting unresponsive user equipment component 108A), distributed unit (DU) 210, and centralized unit (CU) 212.

In general, for gNB 202, DU 210 can provide support for lower layers of a protocol stack, such as radio link control (RLC), medium access control (MAC), and physical layer; and CU 212 can provide support for higher layers of the protocol stack, such as service data adaptation protocol (SDAP), packet data convergence protocol (PDCP), and radio resource control (RRC).

UE 206 can communicate with gNB 202 via DU 210, and DU 210 can communicate with CU 212. Given that architecture, it can be that determinations can be made at DU 210 based on information received (or not received) from UE 206 faster than they can be made at CU 212 (since the information from UE 206 would take time to be transferred from DU 210 to CU 212). In some examples, a determination by detecting unresponsive user equipment component 208A that UE 206 is unresponsive can be made at DU 210, which then sends a user equipment context release request to CU 212 to effectuate releasing UE 206.

Figure 3:
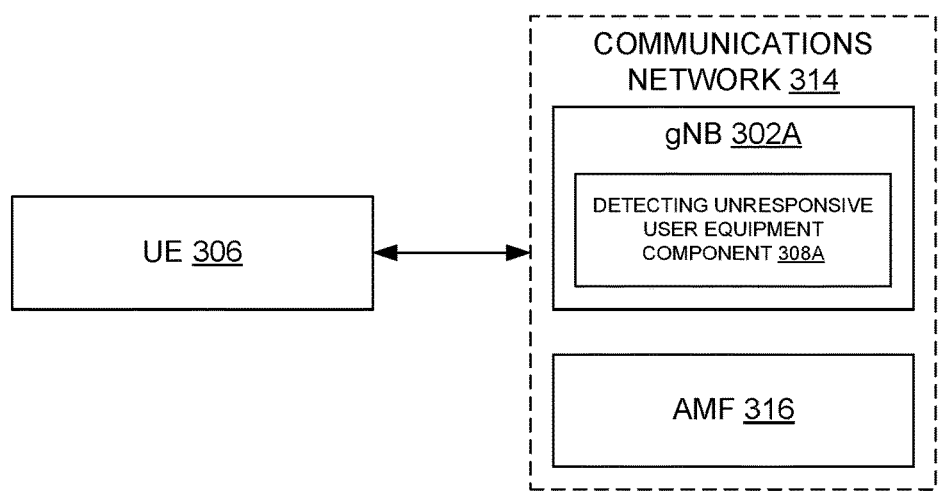
FIG. 3 illustrates another example system architecture that can facilitate detecting unresponsive user equipment, in accordance with an embodiment of this disclosure.

FIG. 3 illustrates another example system architecture 300 that can facilitate detecting unresponsive user equipment, in accordance with an embodiment of this disclosure. In some examples, part(s) of system architecture 300 can be implemented by part(s) of system architecture 100 of FIG. 1 to facilitate detecting unresponsive user equipment. In some examples, part(s) of system architecture 300 can be used to implement the example signal flows of FIGS. 4-5, and/or the example process flows of FIGS. 6-10.

System architecture 300 comprises gNB 302 (which can be similar to an instance of gNB 102 of FIG. 1), UE 306 (which can be similar to UE 106), detecting unresponsive user equipment component 308A (which can be similar to detecting unresponsive user equipment component 108A), and access and mobility management component (AMF) 316. Communications network 314 comprises gNB 302 and AMF 316.

AMF 316 can generally comprise a portion of a cellular communications network (along with gNB 302) that is configured to handle connection and mobility management tasks.

A CU of a gNB that determines that UE 306 is unresponsive (here, gNB 302) can send a user equipment context release to AMF 316 that UE 306 is communicatively coupled to as part of the broadband cellular communications.

Example Signal Flow

FIG. 4 and FIG. 5 illustrate an example signal flow 400 and 500 that can facilitate detecting unresponsive user equipment, in accordance with an embodiment of this disclosure. In some examples, part(s) of signal flow 400 and 500 can be implemented by part(s) of system architecture 100 of FIG. 1 to facilitate detecting unresponsive user equipment.

As depicted, in signal flow 400 and 500, communications are sent between UE 402, gNB 404, and 5G core (5GC) 406 (which comprises access and mobility management function (AMF) 408 and user plane function (UPF) 410).

The signal flow of signal flow 400 and 500 is an example signal flow, and there can be signal flows that implement different signals, or the signals of signal flow 400 and 500 in a different order, as part of facilitating detecting unresponsive user equipment.

As depicted in signal flow 400 and 500, the following occurs:
- 5G-NR RRC connection setup 412.
- Msg1: Preamble 414
- Allocate temporary cell radio-network temporary identifier (C-RNTI) 416
- Physical downlink control channel (PDCCH) downlink control information (DCI) Format 1_0 [random access radio network temporary identifier (RA_RNTI)] 418
- Msg2: Random Access Response 420
- Msg3: RRCSetupRequest 422.
- PDCCH DCI Format 1_0 [C_RNTI] 424
- Msg4: RRCSetup 426.
- PDCCH DCI Format 0_0 [C_RNTI] 428
- RRCSetupComplete 430
- AMF selection 432
- Initial UE message 434 [non-access-stratum-protocol data unit (NAS-PDU): Registration Request]
- NAS identity request/response 436
- NAS authentication request/response 438
- NAS security mode command/complete 440
- UE capability enquiry 442
- UE capability information 444
- Initial context setup request 446 [NAS-PDU: Registration Accept]
- RRCReconfiguration 448 (configure physical uplink control channel (PUCCH) resources to report DL HARQ feedback on PUCCH; configure uplink control information (UCI) on physical uplink shared channel (PUSCH) configuration to report DL HARQ feedback on PUSCH)
- RRCReconfigurationComplete 450
- Initial context setup response 452
- SA UE attach procedure completed 454
- Start downlink data transfer & monitoring of DL HARQ feedback on PUCCH and/or PUSCH 456
- Downlink data 458
- Downlink data 460
- PDCCH DCI format 1_0/1_1 462 [C_RNTI]
- Downlink data 464 [MAC PDU contains physical downlink shared channel (PDSCH)]
- PDCCH DCI format 1_0/1_1 466 [C_RNTI]
- Downlink data 468 [MAC PDU contains PDSCH]
- HARQ feedback=ACK 470
- HARQ feedback=ACK 472
- Downlink data 474
- Downlink data 476
- gNB continuously detecting DL HARQ feedback report as discontinuous transmission (DTX) for all transmitted DL data packets 478
- HARQ feedback=NACK 480
- HARQ feedback=NACK 482
- Channel condition getting worse 484.
- HARQ feedback=NACK 486
- HARQ feedback=DTX 488.
- HARQ feedback=DTX 490
- HARQ feedback=DTX 492 (gNB started detecting T_HARQ_DTX (ms) consecutive HARQ feedback detected at gNB as DTX for determined time in ms)
- T_HARQ_DTX (ms) parameter determined at gNB based on T_HARQ_DTX= (n310*T_EVALUATEOUT_SSB+t310+t301) 494
- DL HARQ-based RLF detect condition met 496 (initiate UE release transaction and send UE context release request to CU with cause (e.g., radio_network_layer, RL failure)
- Standalone (SA) UE release procedure started by gNB-DU 498

Example Process Flows

Figure 6:
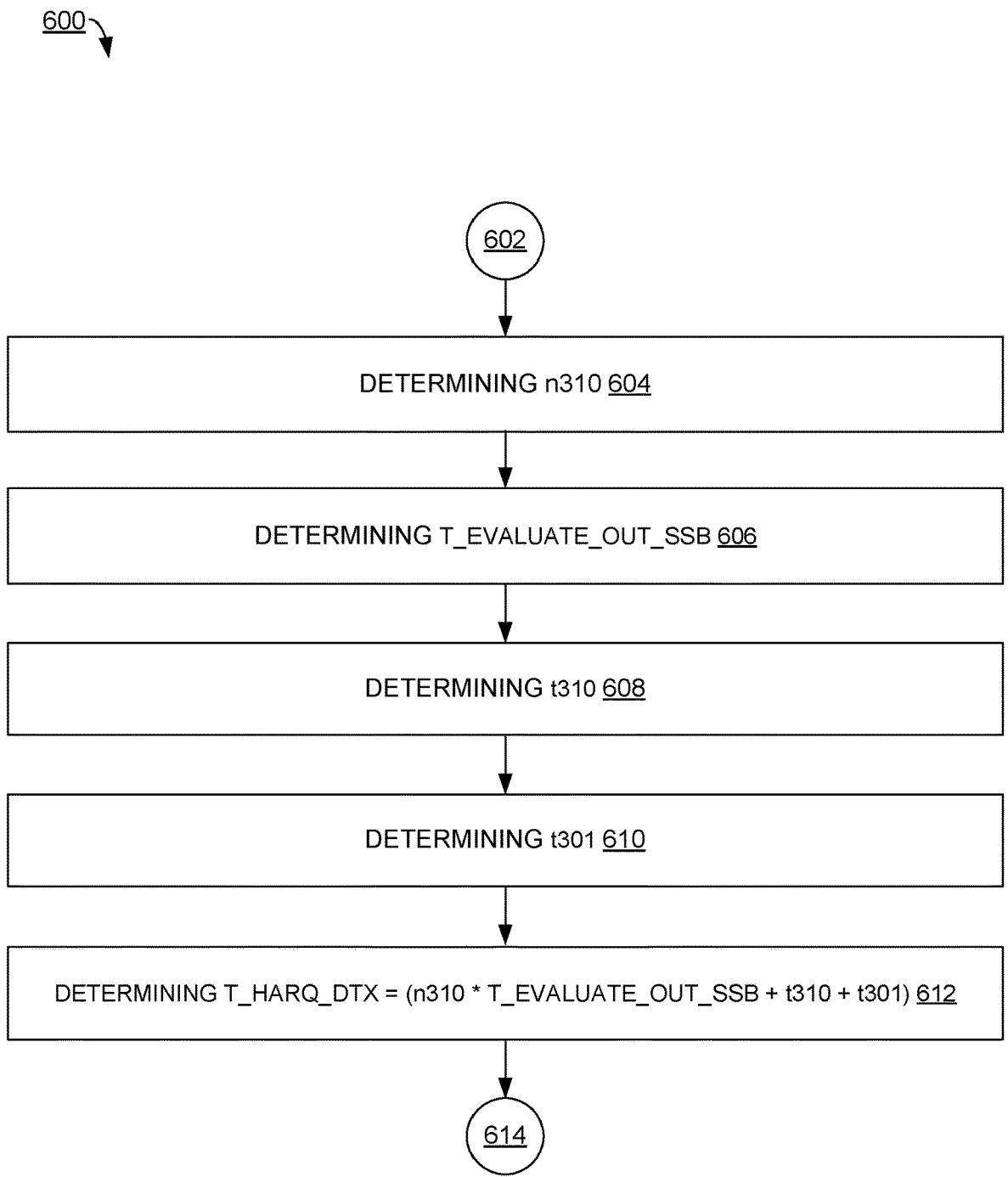
FIG. 6 illustrates an example process flow that can facilitate detecting unresponsive user equipment, in accordance with an embodiment of this disclosure.

FIG. 6 illustrates an example process flow 600 that can facilitate detecting unresponsive user equipment, in accordance with an embodiment of this disclosure. In some examples, one or more embodiments of process flow 600 can be implemented by detecting unresponsive user equipment component 108A of gNB 102 FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

In some examples, process flow 600 can be used to determine T_HARQ_DTX (as described herein) through a determination of:

$$T\_HARQ\_DTX = (n310 * T\_EVALUATE\_OUT\_SSB + t310 + t301)$$

Process flow 600 begins with 602, and moves to operation 604.

Operation 604 depicts determining n310. n310 can comprise a parameter as described herein.

After operation 604, process flow 600 moves to operation 606.

Operation 606 depicts determining T_EVALUATE_OUT_SSB. T_EVALUATE_OUT_SSB can comprise a timer as described herein.

After operation 606, process flow 600 moves to operation 608.

Operation 608 depicts determining t310. t310 can comprise a timer as described herein.

After operation 608, process flow 600 moves to operation 610.

Operation 610 depicts determining t301. t301 can comprise a timer as described herein.

After operation 610, process flow 600 moves to operation 612.

Operation 612 depicts determining T_HARQ_DTX= (n310*T_EVALUATE_OUT_SSB+t310+t301). That is, a value for T_HARQ_DTX can be determined by evaluating this expression.

After operation 612, process flow 600 moves to 614, where process flow 600 ends.

Figure 7:
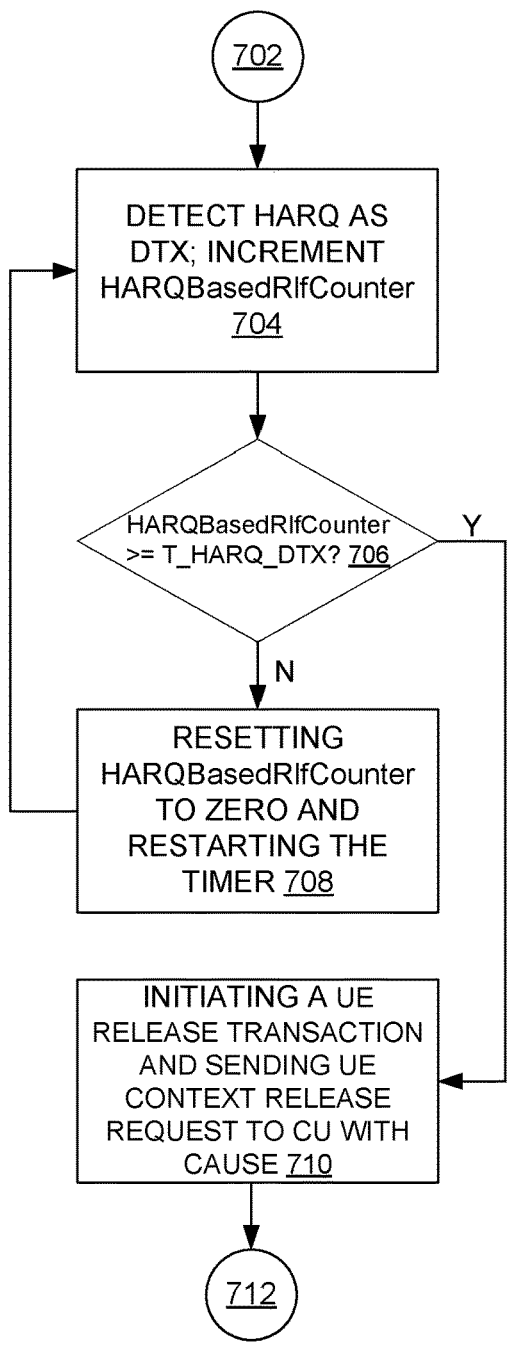
FIG. 7 illustrates another example process flow that can facilitate detecting unresponsive user equipment, in accordance with an embodiment of this disclosure.

FIG. 7 illustrates an example process flow 700 that can facilitate detecting unresponsive user equipment, in accordance with an embodiment of this disclosure. In some examples, one or more embodiments of process flow 700 can be implemented by detecting unresponsive user equipment component 108A of gNB 102 FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 is reached from 702, or from operation 708. Operation 704 depicts detecting HARQ as DTX and incrementing HARQBasedRlfCounter. HARQBasedRlf-Counter can be a counter that incremented every time when HARQ as DTX is detected. When the count is matched with T_HARQ_DTX (as in operation 706) then gNB can start a UE release procedure (as in operation 710).

After operation 704, process flow 700 moves to operation 706.

Operation 706 depicts determining whether HARQBase-dRlfCounter is at least T_HARQ_DTX. That is, using T_HARQ_DTX as determined through process flow 600 of FIG. 6, it can be determined whether that many consecutive HARQ feedbacks have not been received, where HARQBasedRlfCounter can comprise a counter that tracks a number of consecutive HARQ reports that have not been received.

Where it is determined in operation 706 that HARQBase-dRlfCounter is at least T_HARQ_DTX, process flow 700 moves to operation 710. Instead, where it is determined in operation 706 that HARQBasedRlfCounter is not at least T_HARQ_DTX, process flow 700 moves to operation 708.

Operation 708 is reached from operation 706 where it is determined in operation 706 that HARQBasedRlfCounter is not at least T_HARQ_DTX. Operation 708 depicts resetting HARQBasedRlfCounter to zero.

After operation 708, process flow 700 moves to operation 704.

Operation 710 is reached from operation 706 where it is determined in operation 706 that HARQBasedRlfCounter is at least T_HARQ_DTX. Operation 710 depicts initiating a UE release transaction and sending UE context release request to CU with cause. This cause can be, for example, radio_network_layer and/or RL failure. Using the example of FIG. 2, this can comprise DU 210 sending a UE context release request to CU 212, where in this UE context release request applies to UE 206.

After operation 710, process flow 700 moves to 712, where process flow 700 ends.

FIG. 8 illustrates an example process flow 800 that can facilitate detecting unresponsive user equipment, in accordance with an embodiment of this disclosure. In some examples, one or more embodiments of process flow 800 can be implemented by detecting unresponsive user equipment component 108A of gNB 102 FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts communicating broadband cellular communications with a user equipment. Using the example of FIG. 1, this can comprise gNB 102 and UE 106 having set up a connection.

After operation 804, process flow 800 moves to operation 1806.

Operation 806 depicts performing iterations of scheduling downlink data for the user equipment as part of the broadband cellular communications. Using the example of the signal flow of FIGS. 4-5, this can comprise gNB 404 sending UE 402 downlink data 464, downlink data 468, downlink data 474, and downlink data 476.

After operation 806, process flow 800 moves to operation 808.

Operation 808 depicts, in response to determining that hybrid automatic repeat request feedback, which corresponds to downlink data of the iterations of scheduling downlink data, has not been received within a defined time period, initiating a user equipment release transaction with regard to the user equipment, and sending a user equipment context release request to a centralized unit of a base station of a system. that implements process flow 800. Continuing with the example of FIG. 1, this can comprise gNB 102 not receiving a determined number of consecutive HARQ feedback messages from UE 106. In such a case, gNB 102 can initiate a UE release for UE 106, and a DU of gNB 102 can send a UE release request to a CU of gNB 102.

In some examples, the system comprises a distributed unit of the base station, and wherein the sending of the user equipment context release request to the centralized unit is performed by the distributed unit.

In some examples, the system comprises the centralized unit, the user equipment is communicatively coupled to an access and mobility management function component as part of the broadband cellular communications, and operation 808 comprises triggering, by the centralized unit, a user equipment context release that corresponds to the user equipment context release request with the access and mobility management function component. That is, where the communications network comprises an AMF, a CU can trigger a release of the UE to the AMF of the communications network.

In some examples, operation 808 comprises determining a number of occurrences of the hybrid automatic repeat request feedback for the hybrid automatic repeat request feedback not being received within the defined time period based on a time value of a timer that is configured for measurement of whether the user equipment is synchronized with the system. This can be similar to using timer T310.

In some examples, operation 808 comprises determining a number of occurrences of the hybrid automatic repeat request feedback for the hybrid automatic repeat request feedback not being received within the defined time period based on a consecutive occurrences of in-sync indications for a primary cell with respect to the user equipment. This can be similar to N311.

In some examples, operation 808 comprises determining a defined number of hybrid automatic repeat request feedback indications of the hybrid automatic repeat request feedback based on a defined number of consecutive occurrences of out-of-sync indications for a primary cell with respect to the user equipment. This can be similar to n310 as described herein.

In some examples, operation 808 comprises determining the defined number of hybrid automatic repeat request feedback indications based on a product of, the defined number of consecutive occurrences of out-of-sync indications for the primary cell with respect to the user equipment, and a time value of a timer that is configured for measurement of whether the user equipment is synchronized with the system. This can be similar to n310*T_EVALUATE_OUT_SSB as described herein.

After operation 808, process flow 800 moves to 810, where process flow 800 ends.

Figure 9:
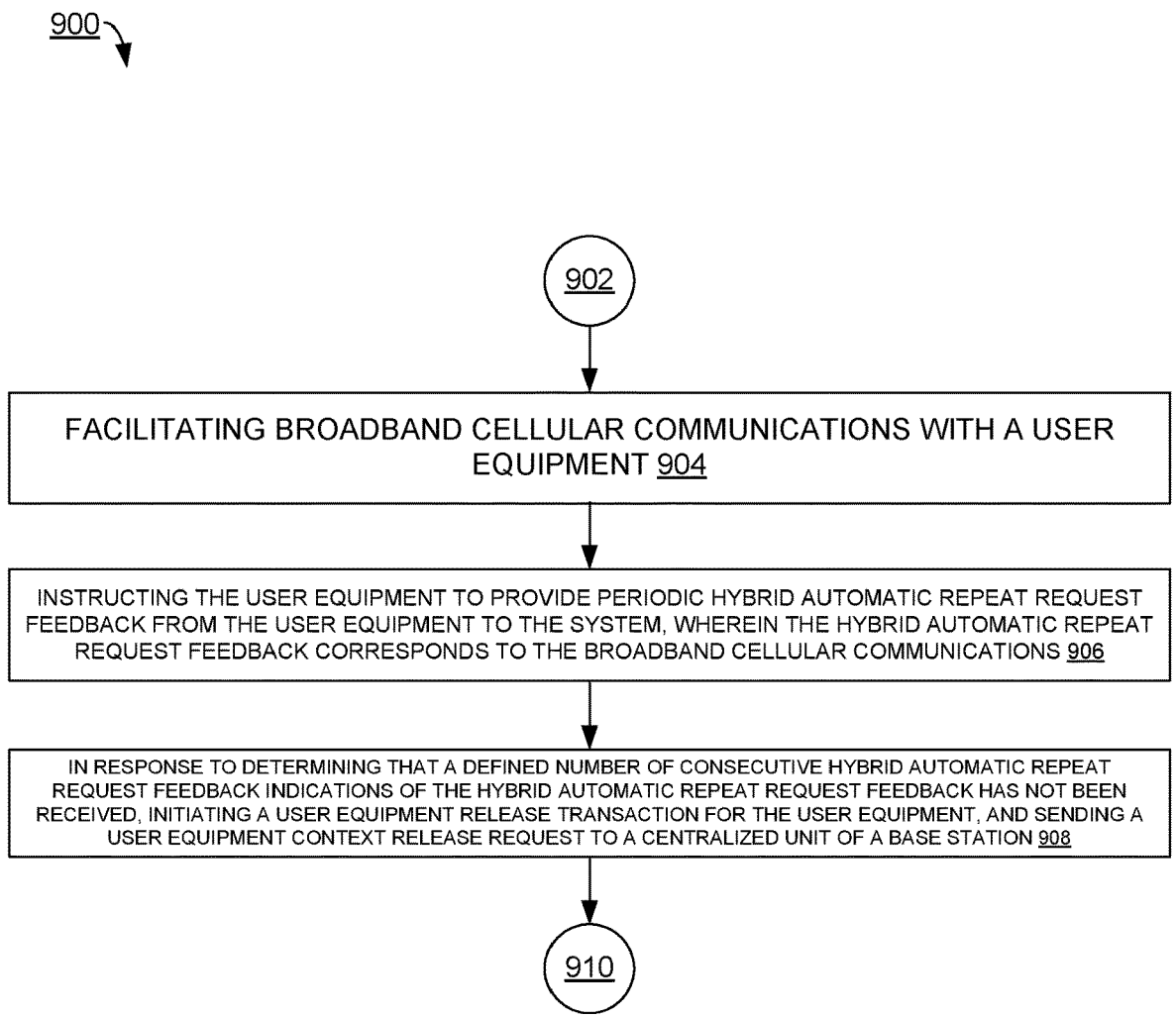
FIG. 9 illustrates another example process flow that can facilitate detecting unresponsive user equipment, in accordance with an embodiment of this disclosure.

FIG. 9 illustrates an example process flow 900 that can facilitate detecting unresponsive user equipment, in accordance with an embodiment of this disclosure. In some examples, one or more embodiments of process flow 900 can be implemented by detecting unresponsive user equipment component 108A of gNB 102 FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8 and/or process flow 1000 of FIG. 10.

Process flow 900 begins with 902, and moves to operation 904.

Operation 904 depicts facilitating broadband cellular communications with a user equipment. In some examples, operation 904 can be implemented in a similar manner as operation 704 of FIG. 7.

In some examples, operation 904 comprises, as part of establishing the broadband cellular communications with the user equipment, sending, by the system to the user equipment, a radio resource control reconfiguration message that indicates a configuration of physical uplink control channel resources to report the hybrid automatic repeat request feedback via a physical uplink control channel. In some examples, operation 904 comprises, as part of establishing the broadband cellular communications with the user equipment, sending, by the system to the user equipment, a radio resource control reconfiguration message that indicates to the user equipment to report the hybrid automatic repeat request feedback in uplink control information. In some examples, the radio resource control reconfiguration message indicates to the user equipment to report the hybrid automatic repeat request feedback in uplink control information via a physical uplink shared channel. This can be similar to RRCReconfiguration 448 (configure PUCCH resources to report DL HARQ feedback on PUCCH; configure UCI on PUSCH configuration to report DL HARQ feedback on PUSCH) of FIG. 4.

After operation 904, process flow 900 moves to operation 906.

Operation 906 depicts instructing the user equipment to provide periodic hybrid automatic repeat request feedback from the user equipment to the system, wherein the hybrid automatic repeat request feedback corresponds to the broadband cellular communications. In some examples, operation 906 can be implemented in a similar manner as operation 706 of FIG. 7.

After operation 906, process flow 900 moves to operation 908.

Operation 908 depicts, in response to determining that a defined number of consecutive hybrid automatic repeat request feedback indications of the hybrid automatic repeat request feedback has not been received, initiating a user equipment release transaction for the user equipment, and sending a user equipment context release request to a centralized unit of a base station. In some examples, operation 908 can be implemented in a similar manner as operation 708 of FIG. 7.

In some examples, operation 908 comprises determining the defined number of consecutive hybrid automatic repeat request feedback indications based on a time value of a timer that is configured for measurement of whether the user equipment is synchronized with the system. This timer can be similar to t310 as described herein.

In some examples, operation 908 comprises determining the defined number of consecutive hybrid automatic repeat request feedback indications based on a consecutive occurrences of in-sync indications for a primary cell with respect to the user equipment. These consecutive occurrences of in-sync indications can be similar to n311 as described herein.

In some examples, operation 908 comprises determining the defined number of consecutive hybrid automatic repeat request feedback indications based on a time measurement during which a downlink radio quality on a radio link monitoring reference signal resource is evaluated to determine whether a first value of the downlink radio quality is less than a second value of a synchronization signal block quality threshold metric. This can be similar to T_EVALUATE_OUT_SSB as described herein.

After operation 908, process flow 900 moves to 910, where process flow 900 ends.

FIG. 10 illustrates an example process flow 1000 that can facilitate detecting unresponsive user equipment, in accordance with an embodiment of this disclosure. In some examples, one or more embodiments of process flow 1000 can be implemented by detecting unresponsive user equipment component 108A of gNB 102 FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8 and/or process flow 800 of FIG. 8.

Process flow 1000 begins with 1002, and moves to operation 1004.

Operation 1004 depicts at least one of sending or receiving broadband cellular communications to or from a user equipment, respectively. In some examples, operation 1004 can be implemented in a similar manner as operation 704 of FIG. 7.

After operation 1004, process flow 1000 moves to operation 1006.

Operation 1006 depicts instructing the user equipment to send periodic hybrid automatic repeat request feedback from the user equipment to the system, wherein the hybrid automatic repeat request feedback corresponds to the broadband cellular communications. In some examples, operation 1006 can be implemented in a similar manner as operation 706 of FIG. 7.

In some examples, operation 1006 comprises configuring a hybrid automatic repeat request feedback information reporting confirmation with the user equipment before initiating the receiving of the hybrid automatic repeat request feedback. In some examples, operation 1006 comprises configuring a hybrid automatic repeat request feedback periodicity with the user equipment before initiating the receiving of the hybrid automatic repeat request feedback. That is, it can be that HARQ feedback confirmation and periodicity can be configurable by a gNB to UE. Based on that configuration, the UE can report the HARQ feedback to the gNB.

After operation 1006, process flow 1000 moves to operation 1008.

Operation 1008 depicts, in response to determining that a defined number of consecutive hybrid automatic repeat request feedback indications of the hybrid automatic repeat request feedback has not been received, initiating a user equipment release transaction for the user equipment. In some examples, operation 1008 can be implemented in a similar manner as operation 708 of FIG. 7.

On some examples, operation 1008 comprises, in response to the determining that the defined number of consecutive hybrid automatic repeat request feedback indications of the hybrid automatic repeat request feedback has not been received, sending a user equipment context release request to a centralized unit of a base station, wherein the user equipment context release request indicates a reason for the user equipment context release request. That is, a UE context release request can be sent to a CU that identifies a cause for the UE context release request.

In some examples, the reason indicates a radio network layer. That is, the cause can be radio_network_layer. In some examples, the reason indicates a radio link failure.

After operation 1008, process flow 1000 moves to 1010, where process flow 800 ends.

Example Operating Environment

Figure 11:
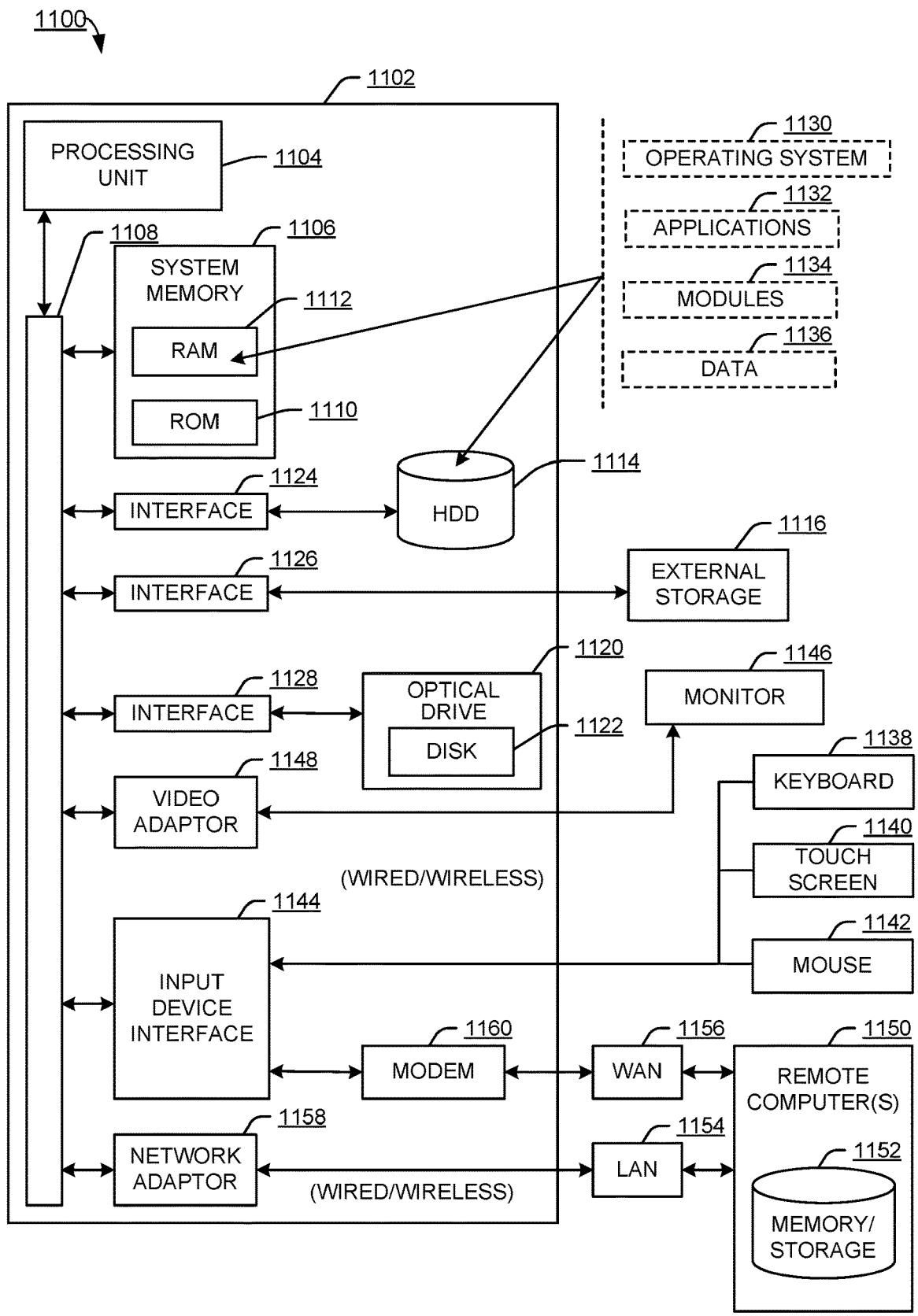
FIG. 11 illustrates an example block diagram of a computer operable to execute an embodiment of this disclosure.

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of gNB 102, Pcell 104, and/or UE 106, of FIG. 1.

In some examples, computing environment 1100 can implement one or more embodiments of the signal flows of FIGS. 4-5, and/or the process flows of FIGS. 6-10 to facilitate detecting unresponsive user equipment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 7-interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        communicating broadband cellular communications with a user equipment;
        performing iterations of scheduling downlink data for the user equipment as part of the broadband cellular communications;
        in response to determining that hybrid automatic repeat request feedback, which corresponds to downlink data of the iterations of scheduling downlink data, has not been received within a defined time period, initiating a user equipment release transaction with regard to the user equipment, and
        sending a user equipment context release request to a centralized unit of a base station of the system.

2. The system of claim 1, wherein the system comprises a distributed unit of the base station, and wherein the sending of the user equipment context release request to the centralized unit is performed by the distributed unit.

3. The system of claim 1, wherein the operations further comprise:
    determining a number of occurrences of the hybrid automatic repeat request feedback for the hybrid automatic repeat request feedback not being received within the defined time period based on a time value of a timer that is configured for measurement of whether the user equipment is synchronized with the system.

4. The system of claim 1, wherein the system comprises the centralized unit, wherein the user equipment is communicatively coupled to an access and mobility management function component as part of the broadband cellular communications, and wherein the operations further comprise:
    triggering, by the centralized unit, a user equipment context release that corresponds to the user equipment context release request with the access and mobility management function component.

5. The system of claim 1, wherein the operations further comprise:
    determining a number of occurrences of the hybrid automatic repeat request feedback for the hybrid automatic repeat request feedback not being received within the defined time period based on a consecutive occurrences of in-sync indications for a primary cell with respect to the user equipment.

6. The system of claim 1, wherein the operations further comprise:
    determining a defined number of hybrid automatic repeat request feedback indications of the hybrid automatic repeat request feedback based on a defined number of consecutive occurrences of out-of-sync indications for a primary cell with respect to the user equipment.

7. The system of claim 6, wherein the operations further comprise:
    determining the defined number of hybrid automatic repeat request feedback indications based on a product of,
        the defined number of consecutive occurrences of out-of-sync indications for the primary cell with respect to the user equipment, and
        a time value of a timer that is configured for measurement of whether the user equipment is synchronized with the system.

8. A method, comprising:
    facilitating, by a system comprising a processor, broadband cellular communications with a user equipment;
    instructing, by the system, the user equipment to provide periodic hybrid automatic repeat request feedback from the user equipment to the system, wherein the hybrid automatic repeat request feedback corresponds to the broadband cellular communications; and
    in response to determining that a defined number of consecutive hybrid automatic repeat request feedback indications of the hybrid automatic repeat request feedback has not been received,
        initiating, by the system, a user equipment release transaction for the user equipment, and
        sending, by the system, a user equipment context release request to a centralized unit of a base station.

9. The method of claim 8, further comprising:
    determining, by the system, the defined number of consecutive hybrid automatic repeat request feedback indications based on a time value of a timer that is configured for measurement of whether the user equipment is synchronized with the system.

10. The method of claim 8, further comprising:
    determining, by the system, the defined number of consecutive hybrid automatic repeat request feedback indications based on a consecutive occurrences of in-sync indications for a primary cell with respect to the user equipment.

11. The method of claim 8, further comprising:
determining, by the system, the defined number of consecutive hybrid automatic repeat request feedback indications based on a time measurement during which a downlink radio quality on a radio link monitoring reference signal resource is evaluated to determine whether a first value of the downlink radio quality is less than a second value of a synchronization signal block quality threshold metric.

12. The method of claim 8, further comprising:
as part of establishing the broadband cellular communications with the user equipment, sending, by the system to the user equipment, a radio resource control reconfiguration message that indicates a configuration of physical uplink control channel resources to report the hybrid automatic repeat request feedback via a physical uplink control channel.

13. The method of claim 8, further comprising:
as part of establishing the broadband cellular communications with the user equipment, sending, by the system to the user equipment, a radio resource control reconfiguration message that indicates to the user equipment to report the hybrid automatic repeat request feedback in uplink control information.

14. The method of claim 11, wherein the radio resource control reconfiguration message indicates to the user equipment to report the hybrid automatic repeat request feedback in uplink control information via a physical uplink shared channel.

15. A non-transitory computer-readable medium comprising instructions that, in response to execution, cause a system comprising a processor to facilitate performance of operations, comprising:
at least one of sending or receiving broadband cellular communications to or from a user equipment, respectively;
instructing the user equipment to send periodic hybrid automatic repeat request feedback from the user equipment to the system, wherein the hybrid automatic repeat request feedback corresponds to the broadband cellular communications; and
in response to determining that a defined number of consecutive hybrid automatic repeat request feedback indications of the hybrid automatic repeat request feedback has not been received, initiating a user equipment release transaction for the user equipment.

16. The non-transitory computer-readable medium of claim 15, wherein the operations further comprise:
in response to the determining that the defined number of consecutive hybrid automatic repeat request feedback indications of the hybrid automatic repeat request feedback has not been received, sending a user equipment context release request to a centralized unit of a base station, wherein the user equipment context release request indicates a reason for the user equipment context release request.

17. The non-transitory computer-readable medium of claim 16, wherein the reason indicates a radio network layer.

18. The non-transitory computer-readable medium of claim 16, wherein the reason indicates a radio link failure.

19. The non-transitory computer-readable medium of claim 15, wherein the operations further comprise:
configuring a hybrid automatic repeat request feedback information reporting confirmation with the user equipment before initiating the receiving of the hybrid automatic repeat request feedback.

20. The non-transitory computer-readable medium of claim 15, wherein the operations further comprise:
configuring a hybrid automatic repeat request feedback periodicity with the user equipment before initiating the receiving of the hybrid automatic repeat request feedback.

* * * * *